United States Patent
McCutchen et al.

(10) Patent No.: US 7,627,235 B2
(45) Date of Patent: Dec. 1, 2009

(54) SPINNING CAMERA ENCLOSURE FOR ENVIRONMENTAL PROTECTION

(75) Inventors: David McCutchen, Protland, OR (US); Craig Adkins, Portland, OR (US)

(73) Assignee: Immersive Media Company, Portland, OR (US)

( * ) Notice: Subject to any disclaimer, the term of this patent is extended or adjusted under 35 U.S.C. 154(b) by 516 days.

(21) Appl. No.: 11/378,088

(22) Filed: Mar. 17, 2006

(65) Prior Publication Data

US 2007/0217782 A1 Sep. 20, 2007

(51) Int. Cl.
*G03B 17/08* (2006.01)
*G03B 17/00* (2006.01)
*G03B 17/02* (2006.01)
*H04N 9/47* (2006.01)
*H04N 5/225* (2006.01)

(52) U.S. Cl. .................. 396/25; 396/427; 396/535; 348/151; 348/375

(58) Field of Classification Search ............... 359/508; 360/75; 396/25
See application file for complete search history.

(56) References Cited

U.S. PATENT DOCUMENTS

| | | | |
|---|---|---|---|
| 6,268,882 B1 * | 7/2001 | Elberbaum | 348/151 |
| 6,731,867 B1 | 5/2004 | Sherwin | 396/25 |
| 7,271,976 B2 * | 9/2007 | Ishii et al. | 360/75 |
| 2002/0140850 A1 * | 10/2002 | Toste et al. | 348/375 |
| 2004/0207726 A1 * | 10/2004 | McCutchen | 348/46 |

OTHER PUBLICATIONS

Quere, Non-sticking Drops, Reports on Progress in Physics, 2005, 68, 2495-2532.
Magnetic Bearing, Website: www.sti.nasa.gov/tto/spinoff1996/62.htm, NASA Scientific and Industrial Information,1996.
Welcome to SKF Magnetic Bearings, Website: http://www.skf.com/portal/skf_rev/home/home?contentId=079391, SKF Group, Göteborg, Sweden 2006.
Bearing User Guide, Website: http://www.waukbearing.com/magnetic_bearings, Waukesha Bearings Corporation, Pewaukee, WI 2006.

* cited by examiner

*Primary Examiner*—Melissa J Koval
(74) *Attorney, Agent, or Firm*—Marger Johnson & McCollom PC

(57) ABSTRACT

An environmental protection system features a clear spinning curved volumetric enclosure to shed and throw off environmental contaminants such as rain, fog and dust that would affect a sensor image. The described design is especially suitable for cameras with extremely wide fields of view, such as panoramic or immersive cameras. Alternate forms of volumetric enclosures are described for different lens arrangements in compound camera systems. In all of these embodiments it is possible to keep the cover and the mechanism spinning it invisible to the cameras. An additional modification of the shape of the volumetric enclosure is described that prevents any accumulation of liquid drops within the fields of view of the sensors within the spinning volumetric enclosure. Alternate forms of construction with air and magnetic bearings are described for smoother and quieter operation of the spinning enclosure.

20 Claims, 3 Drawing Sheets

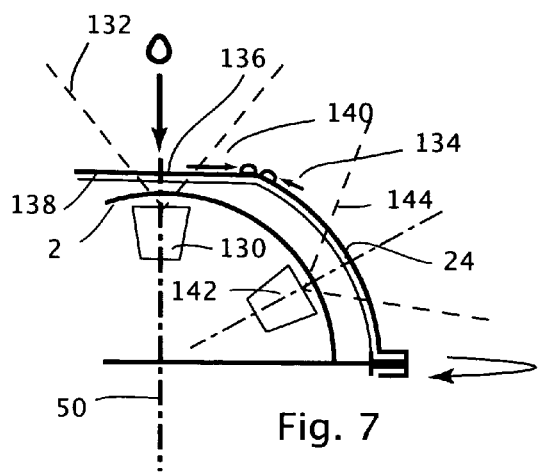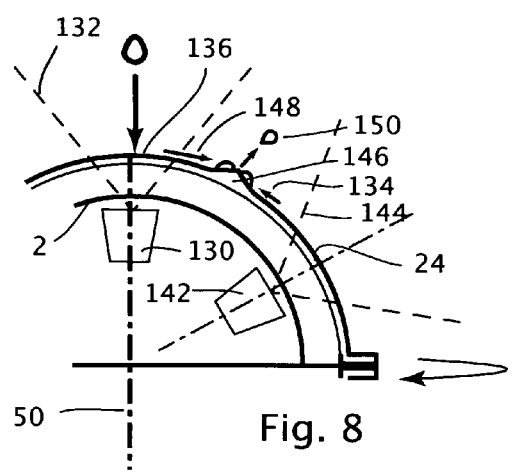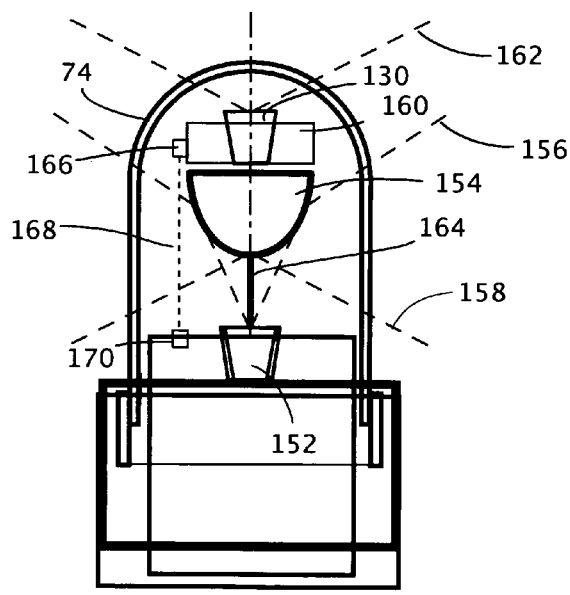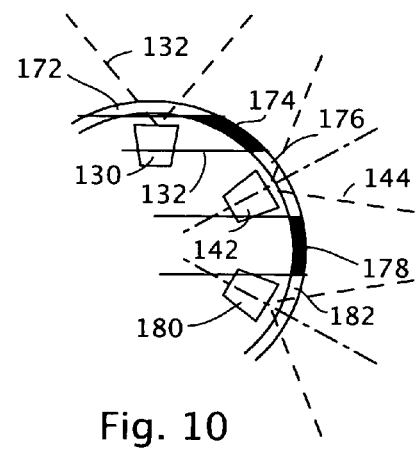

SPINNING CAMERA ENCLOSURE FOR ENVIRONMENTAL PROTECTION

FIELD OF THE INVENTION

This invention generally relates to environmental protection enclosures, and specifically lens protection for camera systems.

BACKGROUND AND SUMMARY OF THE INVENTION

Many environmental factors can diminish the performance of a lens outdoors. Rain, mist, soot and dust all cause the image to become clouded as the clear parts of the lens are covered up. Because water and dirt also can harm the special coatings on the front surfaces of lenses, it is common practice to cover and protect the front elements of lenses with a clear or UV-blocking glass filter, held in place in front of the lens by a screw-threaded enclosure. But this type of filter cover does not prevent water drops from appearing in the lens image in the rain, or dust from clouding the image in a dust storm. To try to prevent this, the camera can be swathed in a hooded waterproof wrapping, with the lens looking out of a tunnel or awning that helps keep out the rain and dust, but which is not visible within the field of view of the lens. However, this does not entirely protect the lens, especially when the lens is pointed up at the rain, and raindrops can sometimes be seen dripping from the forward edge of the tunnel. The camera operator must always be alert and ready to wipe the lens clear if necessary. And when the lens is a wide-angle lens, the tunnel cannot be long enough to protect the lens and still remain invisible.

As camera systems have evolved to include panoramic and immersive cameras, with lenses that in some cases face in many directions at once, the problem has increased. There is now an even larger area to keep protected from the weather, and almost no invisible areas where the means of protection can be hidden.

As an improved glass filter, the Israeli company Spintec has marketed a clear spinning disk which can be placed in front of a camera lens, which is described in U.S. Pat. No. 6,731,867 "Lens Protection Mechanism". The rapid spinning of this disk, at 5000 RPM, prevents raindrops from adhering to the disk surface, and keeps the lens image clear. However, this device has a large frame and motor assembly for spinning the disk, and is designed to be used with a single lens that has a relatively narrow field of view. Because of this, it cannot be used for protecting immersive or panoramic cameras, which often have multiple lenses that look in several directions and would always see such a bulky spinning disk mechanism.

The present invention changes the approach to lens protection to include wide-angle and even immersive camera systems, by the use of a specially designed, rapidly spinning clear volumetric enclosure or "shell." Unlike conventional lens filters, the present invention does not allow the buildup of any raindrops or dust to cloud the lens image. The present invention provides environmental protection from a wide variety of hazards and maintains a clear lens image automatically, without user intervention, and is invisible to camera systems with single or multiple panoramic or immersive camera lenses. In addition, the mechanical rotation of the present invention provides camera stabilization through gyroscopic action, and also the means to cool the camera by blowing air through the protected enclosed space.

BRIEF DESCRIPTION OF THE DRAWINGS

FIG. 7 is a closeup cross section of the rounded top of the spinning cover, showing a raised division between the fields of view.

FIG. 8 illustrates another method of managing the migration of water between adjacent fields of view.

FIG. 9 shows how the spinning volumetric shell can be used with another kind of camera.

FIG. 10 shows details of shell construction for increased safety.

DETAILED DESCRIPTION

In the discussion that follows, terms such as "water," "lens" and "camera" are used to describe the function and operation of the present invention and an exemplary type of sensor that could make use of the invention. No particular limitation should be inferred from these terms; they are used as general descriptors for environmental protection.

The present invention features a rapidly-spinning clear volumetric enclosure or "shell" for a camera system or other type of sensor. The lens or lenses of this camera system look out from within the shell, and the shell and the motor that spins it are designed to be essentially invisible to the camera system. As the shell spins, a constant distance is maintained between the shell and the camera lens or lenses, and any water drops or dust particles that contact the shell surface are quickly thrown off it by a combination of the fast relative motion of the shell, the local air currents at the surface of the shell, and centrifugal force. This automatic shedding of rain, dust and other environmental contaminants keeps the lens image clear over a wide range or environmental conditions.

Figure 1:
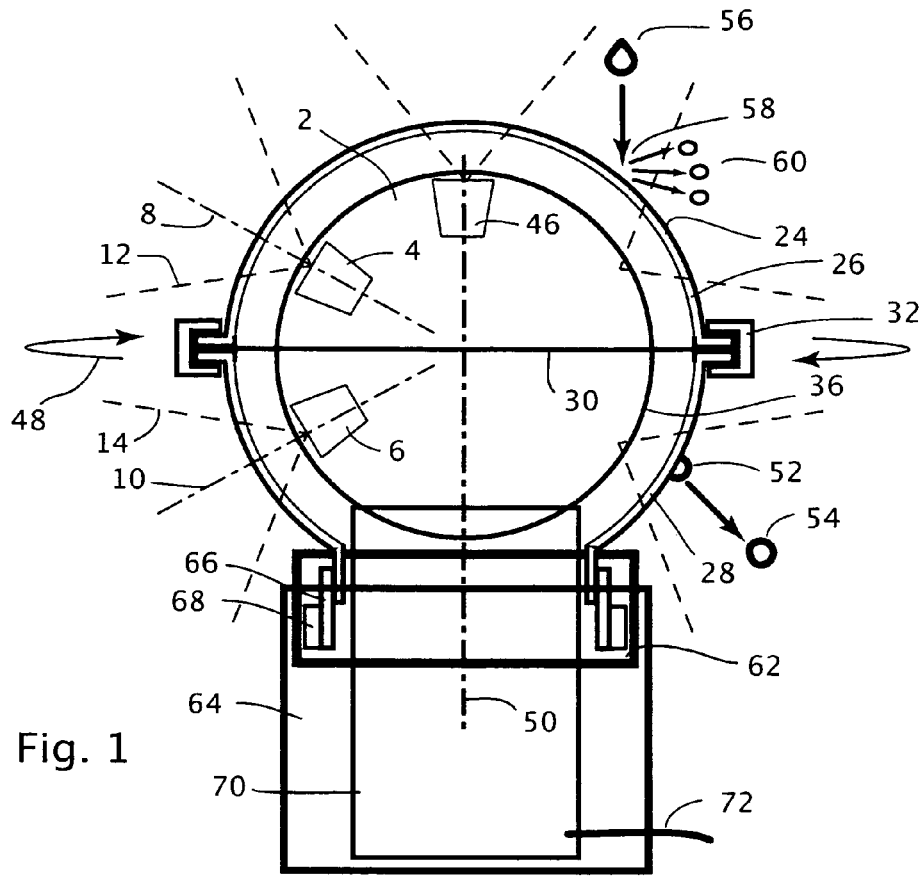
FIG. 1 illustrates a cross section view of a spinning globe cover on a spherical imaging camera.

In FIG. 1, an example camera 2 is shown, featuring multiple lenses 4, 6 that face in different directions, as indicated by optical axes 8, 10, respectively. Only two lenses are shown. It will be appreciated that camera 2 may have only one lens or may have more than two lenses. The following description is directed to two lenses 4, 6 merely as an illustration of one implementation and is not a limitation of the invention.

Lenses 4, 6 have fields of view 12, 14, the central axes of which define the optical axes 8, 10 of lenses 4, 6, respectively. An upward-facing lens is shown at 130. Camera 2 also has associated mounts for the lenses 4, 6 and components for preserving images, such as mechanical components for a film camera or electronic components for a digital camera. In addition, camera 2 may also include a transmission system 54 for transmitting the picture information. In one implementation, camera 2 has the same form as the Dodeca 2360 Telemmersion® camera from the Immersive Media Company of Portland, Oreg. In this implementation, camera 2 has a pedestal 70 that supports the lenses 4, 6 and contains the transmission connection 54 for the export of the camera data.

Enclosing camera lenses 4, 6 is a transparent volumetric enclosure or shell 24, which defines and encloses a three-dimensional volume. In the implementation of FIG. 1, volumetric enclosure or shell 24 is generally spherical and may be formed of clear plastic or tempered glass to be as optically clear and ripple-free as possible. In general, plastic is preferred because of its lower weight and because an acrylic surface sheds water more readily than a glass one.

The spherical shell 24 can be formed from two hemispherical parts 26, 28 to better accommodate the enclosing of camera 2. These two hemispherical sections 26, 28 are joined together securely along an equatorial plane seam 30. Because it falls between the upward and downward-facing fields of view 12, 14 of the lenses 4, 6 and is so close to them, the plane seam 30 will be invisible to the lenses 4, 6, even if the seam 30 includes a joining mechanism such as at 32. An example of a plastic dome with suitable optical clarity is the thick cast plastic hemisphere enclosures used to cover compasses on ocean-going ships. Other hemispheres are currently made as covers for surveillance cameras, including dark versions that act as neutral-density filters.

Figure 2:
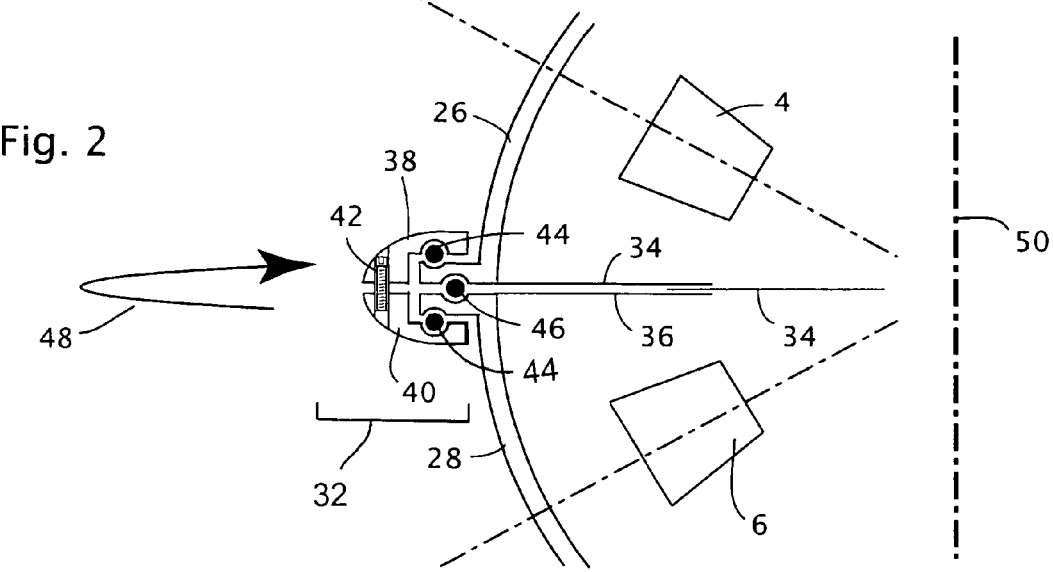
FIG. 2 illustrates a cross section view of the coupling of the upper and lower halves of a globe cover on a spherical imaging camera.

The junction between the halves and the joining mechanism 32 is shown in more detail in FIG. 2. For clarity, the equatorial seam 30 is here divided into upper and lower hemisphere edges 34 and 36 respectively. The joining mechanism is likewise shown as an upper half 38 and a lower half 40. In one implementation, the hemispherical sections 26, 28 are joined along edges 34, 36 by metal rings 38, 40 that are joined together by a evenly spaced bolts 42 around the perimeter, which compress O-ring gaskets to make an environmental seal, such as the O-rings 44 between the joining mechanism and the hemispheres, and the O-ring 46 which is in a groove between the upper hemisphere 26 and the lower hemisphere 28.

The weight of the joining mechanism should be evenly balanced around the equatorial plane of seam 30 to aid in the smooth spinning of the overall shell 24. If this joining mechanism has substantial weight relative to the shell 24, the rapid spinning of this weight in a rotational direction 48 about an axis 50 will create a gyroscopic effect for the camera 2 and shell 24 as a whole, making it steadier and more resistant to any tipping motions when it is in use.

Returning to FIG. 1, the rotational axis 50 is shown as perpendicular to the equatorial plane of seam 30 and its joining mechanism. The volumetric shell 24 is close to and directly in front of each lens 4, 6 with its spherical curvature centered on the optical axes 8, 10 of the lenses 4, 6. With this positioning and a shell of consistent clarity, the high-speed spinning of shell 24 will introduce no significant distortion to the picture. To prevent fogging of the interior surface of the shell 24 from a combination of humidity and temperature change, the shell 24 should be airtight when it is assembled, and the air inside should be dehumidified or replaced by a dry gas such as nitrogen.

The volumetric shell 24 is close to and directly in front of each lens 4, 6 with its spherical curvature centered on the optical axes 8, 10 of the lenses 4, 6. With this positioning and consistent clarity, high-speed spinning of shell 24 will introduce no significant distortion to the picture. To prevent fogging of the interior surface of the shell 24 from a combination of humidity and temperature change, the shell 24 should be airtight when it is assembled, and the air inside should be dehumidified or replaced by a dry gas such as nitrogen.

With the introduction of a spinning motion 48 around rotational axis 50, a water drop 52 on the surface of this shell will be thrown off it 54 by a combination of forces. First, air pressure against the drop, caused by the wind of its relative motion, will overcome its adhesion to the shell 24 and force the drop to move along the shell surface, resulting in the accumulation of small drops (e.g., from dew) into large drops, which have less overall surface area and a larger mass, and are therefore more susceptible to gravity and moving air. Second, centrifugal force from the rotation, combined with the pull of gravity, will cause the drop to detach from the surface and fall away. For a raindrop 56 striking the spinning shell surface 58 the high relative motion of the rotating shell surface 58 prevents the drop from adhering. The prevention of adhesion and the sudden lateral stresses on the drop caused by the impact and the high relative motion tear the drop apart into mist 60, which falls away from the shell 24 because none of its components drops can adhere. The effect of this is that the camera 2 inside the shell 24 will continue to obtain a perfectly clear picture even in a heavy rainstorm. For best results when shedding rain, an uncoated plastic shell should be spun at a minimum of 2700 rpm. This principle of quickly shedding anything that attempts to stick to the shell surface will also work with dust, dirt, sand, salt, fog, etc.

The rotation of shell 24 is provided by a motor assembly 62 positioned in the support enclosure 64. This arrangement of having the motor just below the lenses' field of view prevents the motor assembly 62 from being visible to the camera lenses 4, 6, while being located close to the spinning shell. In one implementation, the motor assembly 62 includes a hollow rotor 66 coupled to the shell 24 inside a concentric stator 68 The camera shown here has a pedestal 70 which includes electronics for the sensors associated with the lenses above which are located inside the shell. The opening within the hollow rotor 68 allows for the insertion of the camera pedestal 70 within it as a first step, followed by the joining of the two hemispheres 26, 28 to complete the shell 24. The motor assembly 62 and the camera 2 within and below it are enclosed in a weatherproof support enclosure 64 to complete the environmental sealing of the components. A cable for transmitting camera information, receiving control signals and power is shown at 72.

Figure 3:
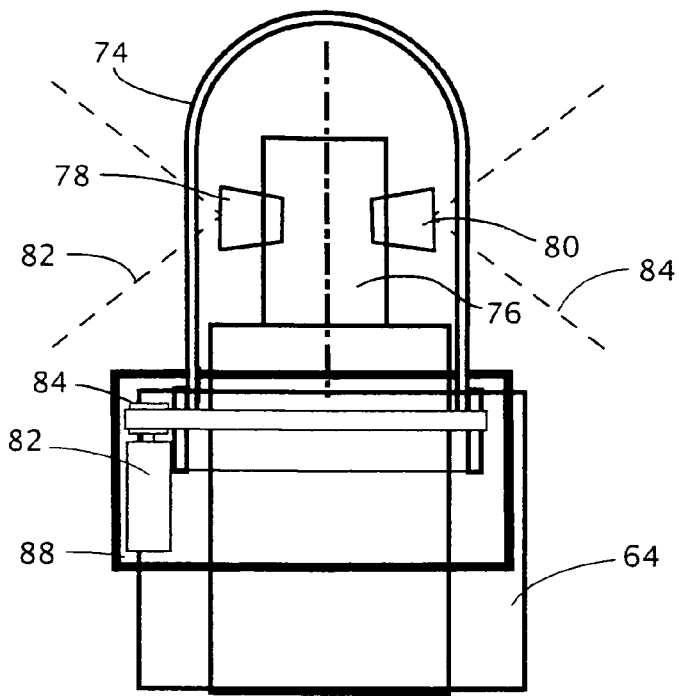
FIG. 3 illustrates a cross section view of an alternative bell-shaped spinning cover.

FIG. 3 shows an alternative embodiment of the present invention as a cross-sectional view of a spinning volumetric enclosure or domed shell 74 in the general shape of a bell jar, consisting of both a spherical and a cylindrical shape. This type of domed shell 74 has an advantage over the spherical shell 24 in that the domed shell can be lowered over a camera 76 in one piece, without any central horizontal seam 30. This makes it more suitable for cameras with horizontally facing lenses such as at 78, 80 with fields of view 82, 84, respectively. The base opening of this shell 74 has to be wide enough to allow it to be fitted over the camera 76 while being put into place for operation. In order to be invisible to the lenses of camera 76, the domed shell 74 should have a height and a diameter that allow camera 74 to be positioned so that the base 64 supporting the domed shell 74 and enclosing the motor arrangement 88 falls outside of the fields of view 82, 84 of the lenses 78, 80. Such a relatively tall domed shell 74 needs to be properly balanced while it is being spun.

The domed shell 74 is shown with an alternate motor 82, which uses a belt drive 84 to rotate the shell. As another alternative, direct-drive wheels (not shown) can be used to drive the shell 74 or 24, typically with the drive wheels directly contacting the shell or an attached structure around the shell periphery. The drive wheels may be attached directly to a motor or may be driven through gears. Sleeper wheels, which are not directly driven other than by contact with the shell periphery, may also be used to stabilize the shell. This type of motor arrangement may introduce extra width to the base, which can complicate the task of keeping the mechanism invisible to the camera. However, this can still be done if the motor or any protrusions is able to be hidden in the gap between two adjacent lenses.

If multiple cameras are used, each facing in a different direction, a substantially continuous composite image can be created as long as the camera fields of view overlap. This technique is used in creating panoramic photographs, up to complete spherical views, from multiple exposures, either taken simultaneously or in sequence. In creating this composite image, the multiple images are cropped, and these cropped portions are blended together. Therefore an element that might be visible in one image, such as the motor for rotating the shell, could be located in the part of the image to be cropped, so that it would be visible in the raw image but invisible in the final composite.

Figure 4:
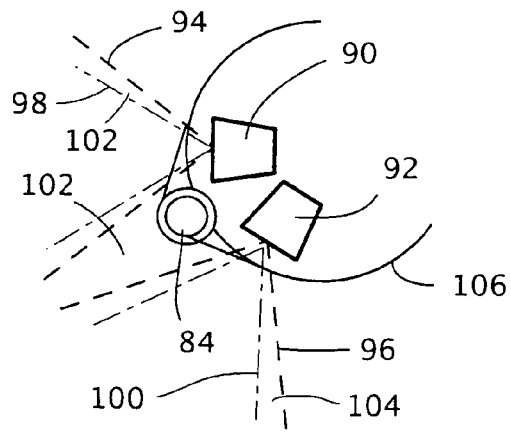
FIG. 4 is a closeup cross section of an air channel for an air bearing for the spinning cover.

FIG. 4 illustrates this invisible area with a top view. Two lenses 90 and 92 have respective fields of view 94 and 96. These lenses can be horizontal as in FIG. 3 or downward facing as in FIG. 1. The fields of view are assumed to be sufficiently wide that a composite image of them can be formed at some distance from the camera, usually by using an inner portion of the field of view 98 and 100, respectively, with an outer region allowing for en extra width to the field of view 102, 104 that is either cropped or used for blending. A motor arrangement 84 that is located between these fields of view and sufficiently close in to the camera and its shell 106 will be invisible. Even if it is visible in the outer area of the field of view 102, 104, it will be invisible in the inner area used for the final composite.

Figure 5:
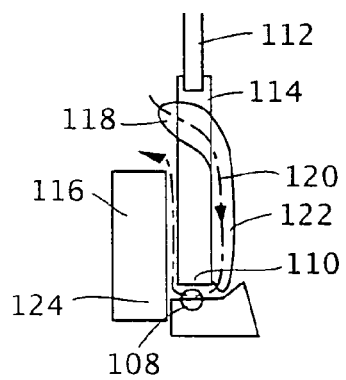
FIG. 5 is a closeup cross section of a magnetic bearing support for the spinning cover.

To minimize the amount of force needed to start and maintain the spinning, the overall weight of the shell 112 and the rotor 114 should be minimized. To reduce friction and achieve smooth and silent operation, an air bearing can be used to support the shell and the rotor, as shown in cross section in FIG. 5. Ball bearings 108 serve as a backup support for the bottom surface 110 when the shell 112 and rotor 114 are spinning slowly or at rest. As the speed of rotation of the rotor within the stator 116 increases, air is directed into the gap beneath the bottom surface, and the air pressure floats the rotor and shell away from the ball bearings and from the stator so it can spin in the air. This air pressure can be made to be a product of the rotation itself if air scoops are incorporated into the rotor structure to gather air through one or more air intakes 118 and direct it downward 120 through a channel 122 into the gap 124. This air intake should be isolated from the rain and other environmental contaminants outside. If ball bearings alone are used for support, they are subject to vibration which causes internal stresses on the shell and the rest of the mechanism, and creates noise at high rotational speeds which interferes with other uses for the camera such as sound recording. Lubricated bearings can also be used, but these are difficult to repeatedly assemble every time the camera is inserted, while maintaining a seal that prevents leaking or contamination of the lubricating fluid.

Figure 6:
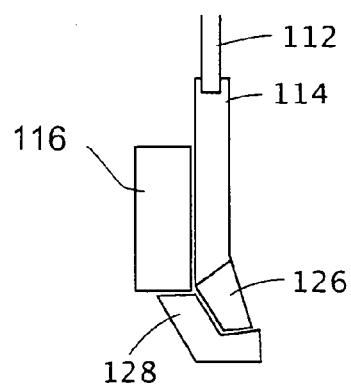
FIG. 6 is a closeup cross section of a flattened top for the spinning cover.

As an alternate means of support, FIG. 6 illustrates a cross section of a magnetic bearing used to support the rotor. The shell 112 and the rotor 114 have a magnetic bearing element on the bottom 126 which corresponds to a static magnetic bearing element 128 which is beneath the rest of the stator 108. When electromagnetically charged, these rotor and stator bearing elements repulse each other, and thereby act to suspend the rotor and its shell while it is spinning. The shapes shown here allow for a coupled shell, rotor and stator bearing element to be lowered into position inside the stator elements after the camera has been inserted. Examples of magnetic bearings are made by SKF Magnetic Bearings of Calgary, Alberta, Canada and Waukesha Bearings of Pewaukee, Wis.

FIG. 7 illustrates a variation in the shape of the top segment of a spinning volumetric shell 24 that is more suitable for a camera 2 that includes a upward-facing lens 130 with a field of view 132 that is centered at or near the rotational axis 50 about which the shell 24 spins. With a spinning volumetric shell having a spherical shape on the rotational axis, such as at the tops of shells 24 and 74, any drops that remain on the surface will tend to migrate upward 134 towards the axial point 136, where water droplets are less likely to be spun away from the surface of the shell because the centrifugal force is less near the rotational axis. To prevent water drops from collecting at the axial point 136 and interfering with the axial field of view 132 of lens 130, the spinning volumetric shell 24 is formed to have a flat axial plane 138 orthogonal to the axis of rotation 50. This flat axial plane 138 is sized to extend beyond the axial field of view 132 of lens 130 to maintain image clarity and uniformity. The flat axial plane 138 magnifies the centrifugal force 140 so that in the region of axial point 136 any water drops will be more likely to be spun outward to the edge of the flat axial plane 138 where they will be outside the axial field of view 132. Drops on the spherically or cylindrically curved surface of shell 90 will likewise not migrate toward axial point 98 and instead will accumulate at the edge of the flat axial plane outside axial field of view 100 or the field of view of any other lens such as the upward-facing lens 142 with its associated field of view 144.

FIG. 8 illustrates another method of managing the migration of water between adjacent fields of view. A concentric pointed ridge 146 between the fields of view, concentric to the axis of rotation, will intercept any downward migration of water drops 148 due to gravity and centrifugal force as well as any upward migration 134 due to differences in centrifugal force. When these accumulating drops meet and coalesce, they will create sufficient weight and size to be spun off 150, thereby keeping the field of view clear.

FIG. 9 shows how this type of spinning volumetric shell can be used with another kind of camera. In this case, the camera is an omnidirectional camera with a single lens 152 directed toward a curved mirror 154, usually hyperbolic or parabolic in shape. The reflection of the outside world on this curved surface effectively defines a panoramic field of view whose upper boundary is at 156 and lower boundary at 158. Here an additional camera 160 with an upward-facing lens 130 is shown above this curved mirror, with a wide field of view 162 which fills in the missing region above the curved mirror. Typically the curved mirror is supported by a clear cylinder or a central spire support 80, which prevents visible cross-reflections in the lens image from the concentric cylindrical shell. For the transmission of power to the upper camera 160 without any visible wires, the power line can be carried inside this central spire 80. For the transmission of image output data from this camera, again without any visible wires, an optical element such as a laser can transmit this information along the line 168 to a receiver 170. The spinning shell 74 will serve to keep all of these fields of view clear.

FIG. 10 shows details of the construction of the shell for increased safety. Because the shell is spinning at such a high rate of speed, anything that would shatter or break the shell would cause shards to fly out concentrically from the camera, endangering bystanders. To prevent this, the construction of the shell should include elements to control any failure of its structural integrity. The choice and arrangement of these elements is summarized here. An upward facing lens 130 and field of view 132 and another lens 142 and field of view 144 are shown as an example. The uppermost region of the shell should be clear, to allow for the clear transmission of the field of view 132. The shape of this upper region can be modified according to the manner described in FIG. 7 and FIG. 8. Because the centrifugal forces in this region are less, there is less stress on this part of the shell. But in the even of failure, this region can be maintained as a coherent disk shape, preferably with a blunt edge, by an integral clear film support such as is found in safety glass. The next region down 174 can be opaque, and made of another material, such as carbon fiber composite or sheet metal, that would be more stress-resistant and shatterproof. The next region 176 is a clear band, which should be reinforced against stress and shattering as much as possible, as described. An equatorial region 178 has the maximum centrifugal stress, but it too can be made of an opaque material in the example, which is located between the fields of view of lens 142 and lens 180. A lower clear area is associated with this lens, reinforced in the manner described for area 176.

If there are fewer cameras, the number of clear bands needed can be accordingly reduced, and the safety of the system thereby increased.

Operations, Ramifications and Scope

It will be appreciated by one skilled in the art that the present invention can also be presented in other embodiments. For example, the principle of the spinning cover can be applied to provide a cover for microwave or infrared sensors or emitters to eliminate the degradation of performance that would be the result of the accumulation of water or dirt on the cover surface.

The shedding of drops can be accelerated by changing the surface of the shell. This will decrease the speed of rotation required to shed water. A coating can be applied to the clear surface such as methyl silicone or Sopus Products' Rain-X®, or a more permanently coated surface can be used such as PPG's Surface Seal® coated glass, which is used for aircraft windshields. The construction of the outside shell can also take advantage of hydrophobic surfaces, which have a special ability to resist water. A survey of these surfaces is described in "Non-sticking Drops" by David Quéré of the Laboratoire de Physique de la Matière Condensée. The form of surface that is most likely to be hydrophobic and also relatively clear is one with a multitude of small pits, as shown in Fig. X, which trap a layer of air underneath a water drop, and make it therefore slide off of the surface. However, this type of surface, also known as a Cassie state, can be contaminated by dirt or other substances which fill in the small pits, and allow water drops to stick, unless the water-shedding action is also assisted or replaced by the spinning action detailed here.

The camera described can be inverted, with the mechanism for spinning the shell located above rather than below the lenses. Other angled or sideways arrangements are also possible.

There may also be more than one opaque region in the overall region. In imaging where a camera is looking downward in all directions from a tower, for example, there may be a smaller blind spot below the camera, representing the tower itself, and a larger one above, representing the sky. The mechanisms for spinning the cover can be located in either or both of these regions, and the cover itself can be more of a ring section, such as a section of a globe covering a range of degrees of latitude.

Although this technology has been particularly illustrated in the context of a multi-sensor imaging system, it will be recognized that certain of these improvements likewise find applications in other contexts, e.g., single sensor imaging systems, and stereoscopic systems where multiple offset camera systems are used. Similarly, although image sensors operating in the visible light spectrum are contemplated, the same principles can likewise be applied for sensors operating at other wavelengths. Still further, although the detailed system describes identical image sensors, this is not a requirement.

It will be evident to artisans that features and details given above are exemplary only. Except where expressly indicated, it should be understood that none of the given details is essential; each is generally susceptible to variation, or omission.

The invention claimed is:

1. An environmental protection system to provide environmental protection for at least one sensor with a field of view and a central axis for the field of view, comprising:
    a volumetric enclosure that has a surface curvature and contains the at least one sensor, the volumetric enclosure being substantially transparent to the sensor; and
    a motor to spin the volumetric enclosure about a rotational axis and across the sensor so as to maintain a constant distance between the volumetric enclosure and the sensor during spinning motion of the volumetric enclosure across the sensor, the motor spinning the volumetric enclosure with a speed sufficient to prevent the adherence and accumulation of environmental elements such as water and dust on an outer surface of the volumetric enclosure.

2. The environmental protection system of claim 1 wherein the surface of the volumetric enclosure is hydrophobic.

3. The environmental protection system of claim 1 wherein the volumetric enclosure contains a plurality of sensors that each has a field of view and a central axis for the field of view.

4. The environmental protection system of claim 3 wherein the rotational axis is centered at or near the field of view of at least one sensor.

5. The environmental protection system of claim 3 wherein a ridge extends outward from the outside surface of the volumetric enclosure in an area between the fields of view of the plurality of sensors to intercept the migration of fluid drops from one field of view to another.

6. The environmental protection system of claim 1 wherein at least one sensor is included in a camera with an optical axis corresponding to the central axis for the field of view.

7. The environmental protection system of claim 6 wherein the volumetric enclosure includes a horizontal equatorial plane and contains multiple cameras having optical axes and fields of view that are directed above or below the horizontal equatorial plane.

8. The environmental protection system of claim 7 wherein the horizontal equatorial plane is outside the field of view of any of the cameras.

9. The environmental protection system of claim 1 wherein the volumetric enclosure includes a horizontal equatorial plane and at least one hemispherical segment with a hemisphere edge that is substantially parallel to the horizontal equatorial plane.

10. The environmental protection system of claim 9 wherein the volumetric enclosure contains a plurality of sensors that each has a field of view and a central axis for the field of view, a substantially continuous composite image is created from the fields of view of the plurality of sensors, and the hemisphere edge is invisible in the substantially continuous composite image.

11. The environmental protection system of claim 1 wherein a reflective surface is placed in front of the sensor and within its field of view.

12. The environmental protection system of claim 1 wherein the areas of the volumetric enclosure outside the field of view of the sensor are composed of a different material than the area within the field of view.

13. The environmental protection system of claim 1 wherein an air bearing supports the weight of the spinning volumetric enclosure.

14. The environmental protection system of claim 1 wherein a magnetic bearing supports the weight of the spinning volumetric enclosure.

15. An environmental protection system to provide environmental protection for at least one sensor with a field of view and a central axis for the field of view, comprising:
 a volumetric enclosure that has a pair of hemispherical shells and contains the at least one sensor, the volumetric enclosure being substantially transparent to the sensor; and
 a motor to spin the volumetric enclosure about a rotational axis and across the sensor so as to maintain a constant distance between the volumetric enclosure and the sensor during spinning motion of the volumetric enclosure across the sensor, the motor spinning the volumetric enclosure with a speed sufficient to prevent the adherence and accumulation of environmental elements such as water and dust on an outer surface of the volumetric enclosure.

16. The environmental protection system of claim 15 wherein the pair of hemispherical shells have a horizontal equatorial plane and contain multiple cameras with optical axes and fields of view that are directed above or below the horizontal equatorial plane.

17. The environmental protection system of claim 15 wherein the pair of hemispherical shells are joined along a hemisphere edge with a joining mechanism that has a significant weight relative to the pair of hemispherical shells so as to steady the volumetric enclosure while it is rotated.

18. An environmental protection system to provide environmental protection for at least one sensor with a field of view and a central axis for the field of view, comprising:
 a volumetric enclosure that has a bell-shaped shell and contains the at least one sensor, the volumetric enclosure being substantially transparent to the sensor; and
 a motor to spin the volumetric enclosure about a rotational axis and across the sensor so as to maintain a constant distance between the volumetric enclosure and the sensor during spinning motion of the volumetric enclosure across the sensor, the motor spinning the volumetric enclosure with a speed sufficient to prevent the adherence and accumulation of environmental elements such as water and dust on an outer surface of the volumetric enclosure.

19. The environmental protection system of claim 18 wherein the bell-shaped shell has an open end that facilitates insertion of the at least one sensor into the volumetric enclosure.

20. The environmental protection system of claim 18 wherein the bell-shaped shell is supported and rotated generally at its open end.

* * * * *